United States Patent [19]

Nakatsukasa et al.

[11] Patent Number: 5,020,771

[45] Date of Patent: Jun. 4, 1991

[54] PROPORTIONAL CONTROL VALVE

[75] Inventors: Keiichiroh Nakatsukasa; Kenmei Kuneguchi, both of Utsunomiya, Japan

[73] Assignee: Ranco Japan Ltd., Tokyo, Japan

[21] Appl. No.: 479,238

[22] Filed: Feb. 12, 1990

Related U.S. Application Data

[62] Division of Ser. No. 306,624, Feb. 3, 1989, abandoned.

[51] Int. Cl.⁵ ............................................. F16K 31/42
[52] U.S. Cl. .......................... 251/30.02; 251/129.05; 251/129.08; 251/129.17
[58] Field of Search ................ 251/129.05, 129.17, 251/129.08, 30.02

[56] References Cited

U.S. PATENT DOCUMENTS

| 4,409,638 | 10/1983 | Sturman et al. .............. 251/30.02 X |
| 4,434,933 | 3/1984 | Tamura . |
| 4,662,604 | 5/1987 | Cook ........................... 251/129.17 X |

FOREIGN PATENT DOCUMENTS

| 850376 | 8/1985 | Australia . |
| 0043256 | 1/1982 | European Pat. Off. . |
| 2552197 | 3/1985 | France . |
| 2558562 | 7/1985 | France . |
| 46-32219 | 9/1971 | Japan . |
| 54-3940 | 1/1979 | Japan . |
| 0078877 | 6/1980 | Japan ............................. 251/30.02 |
| 0146970 | 9/1982 | Japan ............................ 251/129.05 |

OTHER PUBLICATIONS

Patent Abstracts of Japan, vol. 8, No. 182, Aug. 22, 1984.

*Primary Examiner*—Arnold Rosenthal
*Attorney, Agent, or Firm*—Michael N. Meller

[57] ABSTRACT

A proportional control valve has a main fluid passage, a valve portion having a flap, a magnetic element disposed in proximity at end of line the valve portion and mounted integrally in the main passage, a movable body disposed inside the magnetic element and actuated by the magnetic element to directly or indirectly displace the flap of the valve portion and an electric control unit connected to a detector for detecting a characteristic parameter to be controlled, and controlling the movable body in accordance with the detected parameter. This proportional control valve allows a precise and easy fluid flow rate control, as the fluid flow rate can be continuously and precisely varied in proportion to variations in the parameter detected by the detector.

2 Claims, 5 Drawing Sheets

PROPORTIONAL CONTROL VALVE

This application is a division of application Ser. No. 306,624, filed Feb. 3, 1989, now abandoned.

BACKGROUND OF THE INVENTION

1. Field of the Invention

This invention relates to a proportional control valve for a fluid, and in particular, to a proportional control valve for controlling a supply of gas to a gas water heater used for supplying hot water for a bath, a shower, and in a kitchen.

2. Description of the Related Art

In the gas water heater for supplying hot water for a bath, a shower, and in a kitchen, the control of the water temperature is usually carried out by controlling the water flow rate, i.e., increasing or decreasing same.

In this kind of a gas water heater, however, a problem arises in that, when the water temperature is to be raised, the water flow rate must be reduced, and conversely, when the water temperature is to be lowered, the water flow rate must be increased.

To overcome the above problem, a system for providing hot water at a constant temperature and at a constant rate has been developed. In this system, however, the amount of gas supplied thereto must be controlled by using a proportional control valve, to obtain a desired hot water flow rate while keeping the temperature thereof constant, and further, to control a fluid such as gas, a variable valve such as a governor valve 1 shown in FIG. 1 must be used.

Usually this governor valve 1 has a construction such that a valve portion 15 having a flap 4 is provided in a main passage 13 connecting an inlet 2 and an outlet 3 of a fluid R, and a separated chamber 11 is provided on one side of the valve portion 15 facing the direction from which the fluid R is introduced. Further, two separate subchambers are formed inside the separated chamber 11 by providing a diaphragm 6 between a wall portion of the separated chamber 11 and supporting rod 5 mounted on the flap 4 of the valve portion 15 and movable with the flap 4, to cause one of the subchambers formed between the valve portion and the diaphragm to become a part of the main passage for the fluid. The flap 4 is biased upward by a lower spring 7 attached to the bottom portion of the flap 4 and biased downward by an upper spring 8 attached to the upper portion of the supporting rod 5 through the spring receiver 10.

In this construction, when the fluid R is not supplied to this main passage, i.e., a fluid pressure is not applied to the surface of the flap 4, the valve portion 15 is fully open because the spring force A of the spring 8 is larger than that of the spring force B of the spring 7.

When a fluid R having a regulated pressure, i.e., an initial pressure $P_1$ is applied at the entrance 2 of the main passage and the fluid R has an output pressure, i.e., secondary pressure $P_2$, the flap 4 will be brought to a balanced position as indicated by the following equation, $$P_2 \times \text{(an effective area of the flap)} = A - B$$

and therefore, a gap 16 is formed between the wall 19 separating the main passage 13 and the flap 4, and the amount of gas passing through the gap 16 is controlled.

In this type of the governor valve, however, the amount of fluid supplied, for example, amount of gas, is set to a constant value when the diameter of a nozzle of a main gas burner is constant.

Namely, when the supply of gas is to be increased, i.e., the initial pressure $P_1$ thereof is to be increased to raise the temperature of the water, or vice versa, the secondary pressure $P_2$ of the output gas is generally fixed to a certain value, as shown by a curve c in FIG. 2, because of the spring force applied to the flap 4 of the valve portion 15 by the spring 7 and 8, and thus a precise control as desired cannot be obtained.

Accordingly, to solve the above problem, the screw 9 provided at the top of the spring 8 must be adjusted, for example, the force applied to the flap 4 by said spring 8 must be varied, to obtain the variable curves shown by curves a and b of FIG. 2.

In FIG. 2, curve a shows the curve of the secondary pressure $P_2$ with respect to the initial pressure $P_1$ when a strong force from the spring 8 is applied to the flap 4, and curve b shows the curve of the secondary pressure $P_2$ with respect to the initial pressure $P_1$ when the lower pressure of the spring 8 is applied to the flap 4.

Nevertheless, this mechanism is manually operated, and therefore, an adjustment as above simultaneously with a detection of the water temperature is difficult, and the device therefore is complex, and therefore, a precise adjustment is difficult and this system is not satisfactory when controlling the temperature of the water.

In another known system, proposed in an attempt to overcome the problems, a plurality of ON-OFF type electromagnet valves are utilized and the gas flow supplied thereto is controlled in multisteps.

In this system, however, the adjustment at each valve can be carried out only in such a way that the force applied to the flap of the valve by the spring is varied by an ON-OFF signal generated when a signal is detected which is higher than a predetermined threshold value with respect to the variation of the detected data for, for example, the water temperature.

Accordingly in this system, the operation of the electromagnet values and the adjustment of the force of the spring is varied only in two steps, and therefore, the amount by which the supply of gas can be varied in this system is limited, and thus it is very difficult to precisely adjust the water temperature.

Further, in the prior art, a transformer is widely used to supply an electric current to the electromagnet values, and this has the disadvantages of a large size and complex control circuit, and the generation of noise at the electromagnet by an ON-OFF operation thereof.

SUMMARY OF THE INVENTION

The object of the invention is eliminate the defects mentioned above and to provide a proportional control valve by which a characteristic parameter can be accurately and precisely controlled by varying the spring force applied to the governor valve, to enable the supply of the fluid to be freely and variably adjusted in accordance with a characteristic parameter for this control, for example, a variation of the temperature of the water from the gas water heater, and thereby enable the secondary pressure of the fluid to be freely varied to a desired value.

DESCRIPTION OF THE PREFERRED EMBODIMENTS

Figure 1:
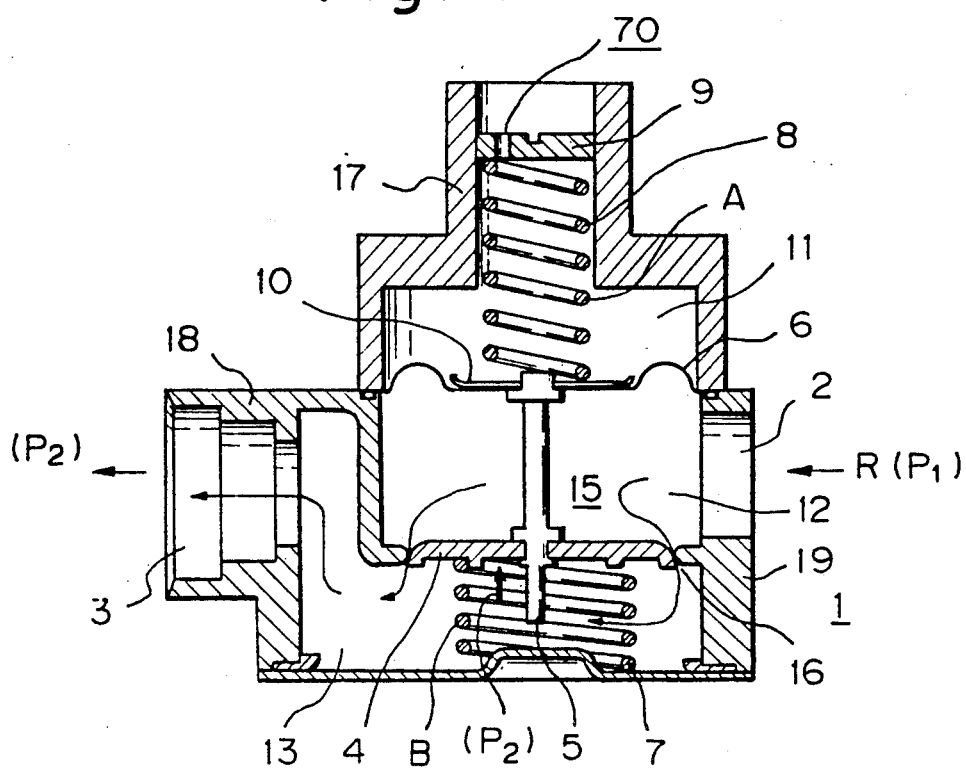
FIG. 1 is a cross sectional view of a conventional governor valve.
Figure 2:
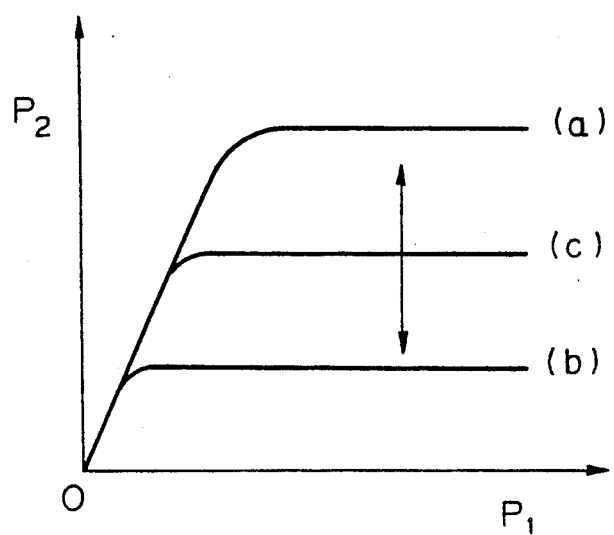
FIG. 2 is a graph showing the relationship of the secondary pressure $P_2$ and the initial pressure $P_1$ of a fluid and a parameter of the spring force of an upper spring when applied to the governor valve.

The preferred embodiments of this invention will be described with reference to the accompanying drawings. These embodiments only exemplify this invention and many variations thereof can be made without exceeding the scope of the technical concept of this invention.

To obtain the objects of this invention, the proportional control valve of this invention comprises a main passage for a fluid; a valve portion having a flap; a magnetic means disposed in proximity to the valve portion and mounted integrally on the main passage; a movable body disposed inside of and actuated by the magnetic means, to directly or indirectly displace the flap of the valve portion; and an electrical control means connected to a detecting means for detecting characteristic data to be controlled, whereby the movable body is controlled in accordance with the detected data.

Any fluid such as a liquid or gas can be used in this invention, although preferably a fuel gas is used. Further, the proportional control valve of this invention is not restricted to use in gas water heater but can be used for any kind of control system in which operation of the device is controlled under predetermined conditions by detecting characteristic data of, for example, an amount of fluid, a temperature of the fluid, and the concentration viscosity, and density of the fluid.

The basic construction of the proportional control valve used in this invention comprises a main fluid passage, a valve portion having a flap, and an electric control means for controlling the flap of the valve portion by minutely and continuously varying the opening of the valve, as described above.

In this invention, the valve portion may comprise only a flap, the position thereof being displaced under the direct control of the electric control means, or the construction of the governor valve as described above may be used in this invention.

Further, as the control means for controlling the flap of the valve portion, a system is used in which a movable body, e.g., an armature, is provided inside the magnetic means located in proximity to the valve portion and is directly or indirectly connected to a portion of the flap of the valve portion provided in the main passage of the fluid.

In this embodiment, the magnetic means may be a permanent magnet or an electromagnet supplied with a constant voltage or electric current.

As already known, the movable body is supported inside the magnetic means in a balance state by both the upper spring, which urges the flap downward, and the lower spring, which urges the flap upward.

In the first embodiment of this invention, the magnetic means consists of an electromagnet connected to an electric control means for controlling the electric voltage or the electric current supplied to the electromagnet.

The electric control means is connected to a detecting means for detecting a characteristic parameter to be controlled, for example, a water temperature detector, a fluid concentration detector, a fluid volume detector or the like, through a suitable electric circuit such as a comparator, an amplifier, an analog-digital convertor or the like.

The analog signal for the characteristic parameter to be controlled and detected by the detector is transferred to the electric control means directly or after conversion to a digital signal by the A/D convertor, and the signal is compared with a predetermined signal as threshold data to generate a varied electric voltage or current corresponding to the difference between the detected data value and the threshold value, and to supply the voltage or current to the electromagnet.

In another embodiment, the magnetic means may consist of a permanent magnet and a coil means provided on the external surface of the movable body.

In this embodiment, a coil is wound a suitable number of turns on the surface of the movable body and the same electric control means as used in the previous embodiment is connected to the coil means.

In both embodiments, when the electric voltage or current is supplied to the coil by the electric control means, the magnetic flux generated inside of the magnet means will be varied and will displace the movable body by a predetermined distance corresponding to the value detected by the detecting means when detecting the characteristic parameter to be controlled, opposing the spring force applied thereto, and thus the flap of the valve portion or the supporting rod mounted on the flap connected to the movable body is displaced to enable the opening of the valve to be freely varied to a desired width.

Therefore, in these embodiments, by supplying an electric signal corresponding proportionally to variations of the characteristic parameter to be controlled by the electric control means, the position of the movable body in the magnet means will be changed by the predetermined distance corresponding to the variation of the detected data, and thus the opening of the valve portion is varied in proportion to the variation of the detected data and the control operation can be variably and precisely carried out.

In these embodiments, when the magnetic flux is reduced, the movable body can be moved backward by the spring force always applied thereto. Further, in these embodiments, the movable body may be placed in direct contact with a portion of the flap or the supporting rod of the flap, both of which are a component of the governor valve, or in indirect contact through, for example, a spring or a spring plate, or in indirect contact with a fluid therebetween.

In this invention, the electric control means for controlling the movable body by actuating the electromagnet, or with a coil means provided on the movable body, is provided and the basic method of this control is that the adjustment of the force applied to the flap by the spring can be made by displacing the position of the movable body by varying the magnetic flux generated inside the magnet means, by supplying an electric voltage or current corresponding to the variation of the detected characteristic parameter to be controlled to the electromagnet or the coil, to vary the attraction or repelling force therebetween instead of manually adjusting the spring force by the adjusting screw as in the prior art.

In the second embodiment described above, the magnet means may be a permanent magnet or an electromagnet to which a constant level voltage is supplied.

In this invention, the proportional control valve may be used in the main fluid passage or may be used as a pilot valve for controlling the main fluid valve in such a manner that a part of the fluid flowing in the main passage is divided and directed into an auxiliary passage.

The pilot valve, as an auxiliary valve portion having the same construction as explained above, is provided in the auxiliary passage to control the fluid flow rate by the proportional control method described above, and the main valve portion, for example, a governor valve, is controlled by the thus controlled fluid.

In this embodiment, the auxiliary valve is actuated by a pulse wave to cause an auxiliary flap thereof to vibrate. This vibration is absorbed in the fluid output from the auxiliary valve, and therefore, will not affect the diaphragm of the main valve portion, and thus the control operation is not affected.

The electric control means may be configured in such a manner that the characteristic parameter signal to be controlled is detected by the detecting means, usually in an analog form, and converted to a digital signal, and a pulse wave voltage preferably having a constant frequency is generated in accordance with the digital signal. The electric control means may be further configured in such a manner that a pulse wave voltage can be generated having a varied duty cycle corresponding to the difference between the detected characteristic parameter to be controlled and the reference level thereof.

In this invention, the duty cycle is defined as a ratio of the output width W of the pulse to the frequency T of the same (W/T).

Namely, as shown in FIG. 7 (A), when a pulse having a small duty cycle W/T is applied to the electromagnet or the coil, the magnetic force applied to the movable body is small, and therefore, the movable body is attracted by the magnet to reduce the opening of the valve portion. On the other hand, as shown in FIG. 7 (B), when a pulse having a large duty cycle W/T is applied to the electromagnet or the coil, the magnetic force applied to the movable body is increased, and therefore, the movable body is repelled by the magnet to increase the opening of the valve portion.

Note that, in this invention, since a pulse having a different duty cycle corresponding to the variation of the detected characteristic parameter to be controlled with a constant frequency is generated in accordance with the detected data signal thereof and used for the control, the control operation is carried out easily and a proportional control thereof can be carried out with extreme accuracy and precision.

Usually, the coil used for the proportional control valve used in a low-voltage circuit with a direct current requires an electric current of about 200 mA, and therefore, a large-sized transformer is required and accordingly space and expense problems arise. Moreover, to obtain a complete direct current, a relatively large size smoothing circuit is required.

By using the proportional control system of this invention utilizing a pulse of 100 V having a different duty cycle, a direct current source having a low voltage is required and a transformer is not required because such a pulse can be obtained from a commercial electric source AC100 V simply through a full-wave rectifier circuit and a half-wave rectifier circuit.

Therefore, the proportional control valve circuit utilizing a pulse having a different duty cycle can be simplified compared with that of the prior art, and moreover, noise generated from the valve will be completely suppressed.

EMBODIMENT 1

Figure 3:
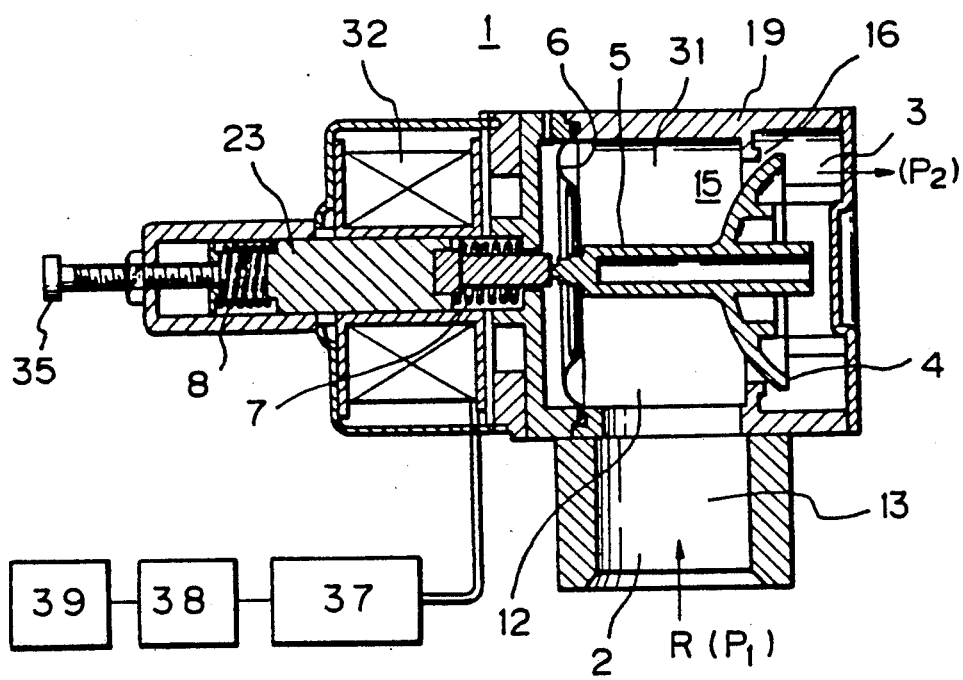
FIG. 3 is a cross sectional view of a first embodiment of the proportional control valve according to the present invention.

FIG. 3 shows one embodiment of the proportional control valve of this invention.

In this embodiment, a governor valve 31 comprising a valve portion 15 composed of a flap 4 and a part of a wall of the passage 19 and a diaphragm 6 extended between the wall of the passage 19 and a top portion of a support rod 5 mounted on the flap 4, is provided in a main fluid passage 13 having an entrance 2 and an exit 3, and further, an electromagnet 32 having a central aperture, a movable body, i.e., a plunger 23 slidably provided therein, is also provided in the vicinity of the governor valve 31; one end portion of the movable body 33 being attached to the top end of the supporting rod 5 in the governor valve 31.

The movable body 33 is supported by a spring 7 provided between the portion of the movable body 33 facing the governor valve 31 and the surface of the wall 19 of the governor valve 31, and another end portion of the movable body 33 is attached to an adjusting screw 35 through a spring 8.

Therefore, the movable body 33 is supported inside the magnet 32 in a balanced state caused by the springs 7 and 8. The electromagnet 32 is supplied with an electric voltage or electric current by the electric control means 37.

Where the proportional control valve of this embodiment is used to adjust the fuel gas flow rate in an instantaneous gas water heater providing a constant water flow, the temperature of the water output therefrom is detected by a temperature detector 39 and the analog data thus detected is, for example, converted into digital data by an analog-digital converter 38, and thereafter, is transferred to the electric control means 37 to compare the thus transferred data with a reference data and to output a data signal corresponding to the difference between the detected data and the reference data. Then the signal output from the electric control means is applied to the electromagnet 32 to control the position of the movable body.

When this signal is applied to the magnet 32, the density of the magnet flux is varied by an amount corresponding to the data detected by the detector of the temperature of the water, and thus the repellent force or the attraction force created between the magnet and the movable body is varied to move the movable body 33 to a position at which a new balanced state is created by the magnetic force and spring forces.

Accordingly, the force applied to the supporting rod 5 of the governor valve 31 is varied in accordance with the detected parameter, i.e., the detected temperature of the water, and therefore, the gas flow passing through the valve portion 15 is proportionally and desirably controlled to supply a required gas flow rate to a gas burner of the gas water heater meeting the conditions at the time the detecting operation was carried out. In this embodiment, for example, when the temperature of the water thereof is lowered, the voltage applied to the electromagnet is increased to increase the displacement of the movable body, and thus increase the gas flow rate through the valve portion, and vice versa.

EMBODIMENT 2

Figure 4:
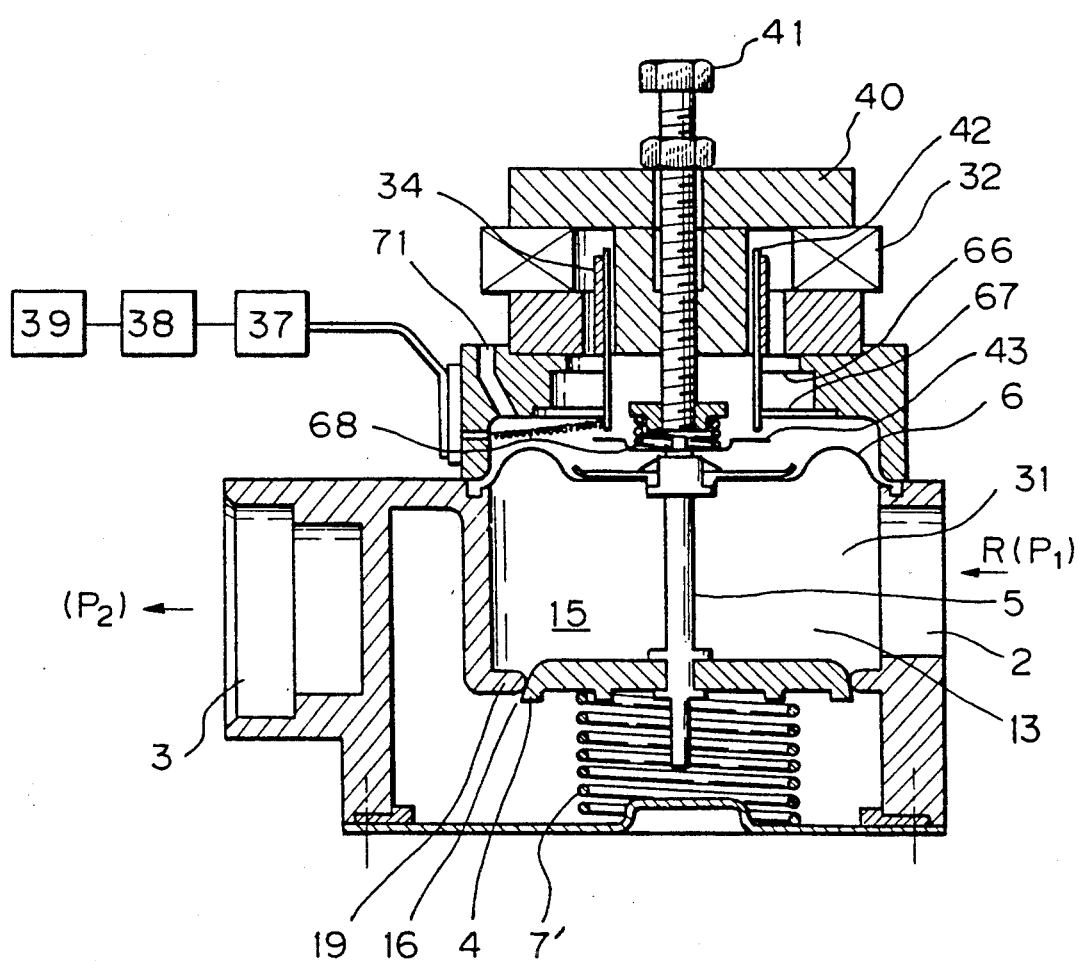
FIG. 4 is a cross sectional view of a second embodiment of the proportional control valve according to the present invention.

FIG. 4 shows another embodiment of the proportional control valve of this invention.

In this embodiment, a governor valve 31 having the same construction as described in the first embodiment is provided in the main fluid passage 13, but the flap 4 of the valve portion 15 is supported by a spring 7' provided between the flap 4 and the bottom of the passage 13, a spring plate 43 is provided on the top portion of the governor valve 31, and an adjusting spring 68 is provided between the plate 43 and the bottom end portion of an adjusting screw 41 explained later.

In this embodiment, the magnetic means provided on the governor valve 31 consists of a permanent magnet 32 with a center aperture, a center pole 40 having an adjusting screw 41, inserted in the center aperture and inside of the magnet and outer surface of the center pole 40. A cylindrical armature 42, i.e., a bobbin coil, having a coil wound on the surface thereof is provided; the cylindrical armature 42 is made of a non-magnetic material and thus cannot be attracted to the magnet 32.

The cylindrical armature 42 is supported at a predetermined position by supporting plates 66 and 67 having a spring function, and in certain cases, the bottom end thereof is attached to the spring plate 43 mounted at the top end of the supporting rod 5 of the governor valve 31.

The end portion of the adjusting screw 41 facing to the governor valve is disposed opposite to the top end of the supporting rod 5 with a suitable space therebetween, to prevent an excessive backward movement thereof.

In this embodiment, an aperture 71 for introducing atmosphere may be provided.

When a desired current is applied to the coil 34 of the armature 42, the pressure applied to the governor valve is adjusted in the same way as that of the spring 8 in FIG. 3, and at that time, the bottom end of the armature 42 comes into contact with the spring plate 43 to push the diaphragm 6, the flap 4, and the supporting rod 5 downward.

In this embodiment, the coil means is connected to the same electric control means 37 as in the first embodiment, and accordingly, the function and operation of the valve portion in this embodiment is the same as that of the valve portion of the first embodiment.

Figure 7A:
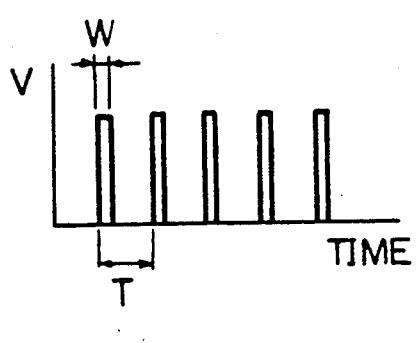
Figure 7B:
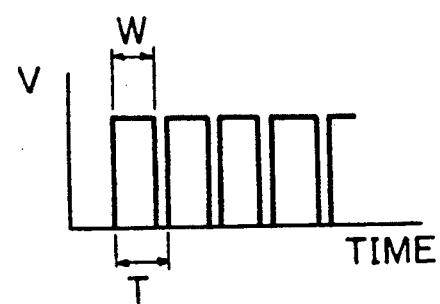

Note, in this embodiment, pulse waves having different duty cycles, as shown in FIGS. 7a and 7b can be used instead of varying the electric voltage.

EXAMPLE 3

Figure 5:
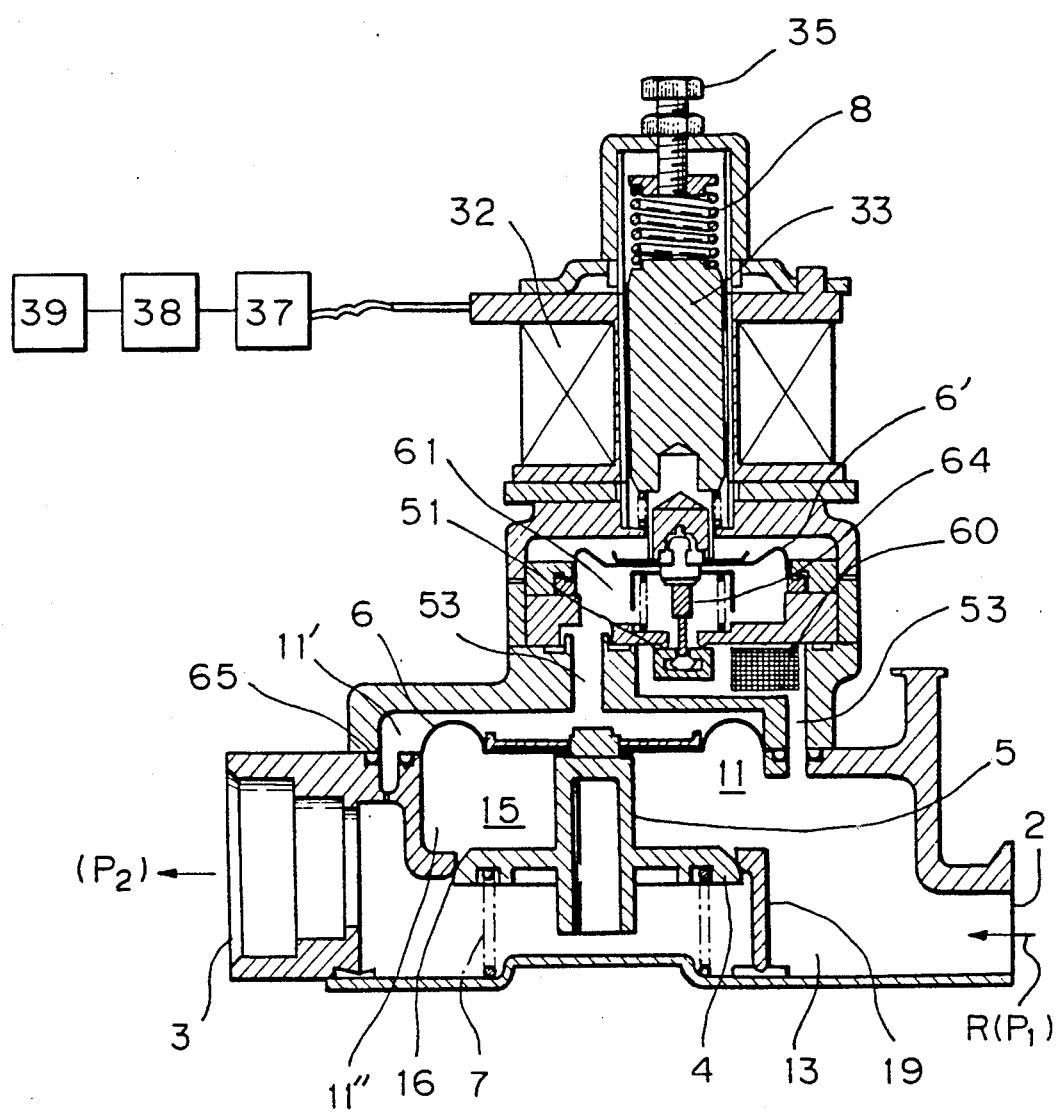
FIG. 5 is a cross sectional view of a third embodiment of the proportional control valve according to the present invention.
Figure 6:
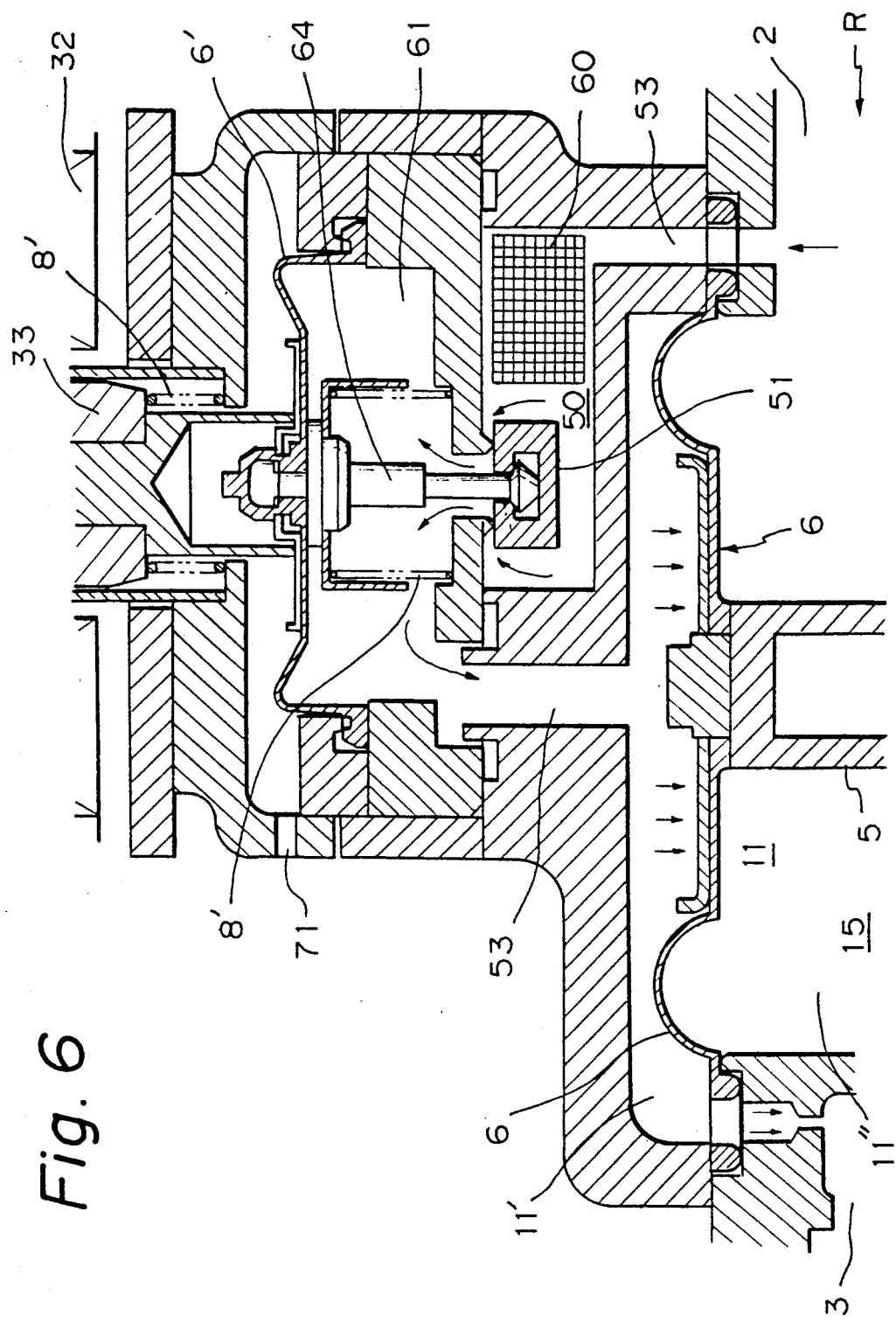
FIG. 6 is a partially enlarged cross sectional view of the control valve shown in FIG. 5; and, FIGS. 7a and 7b show two examples of pulse wave forms used in this invention.

FIG. 5 shows another embodiment of the proportional control valve of this invention, in which the proportional control valve is used as a pilot valve and utilizes a pulse wave.

In this embodiment, the proportional control valve comprises a main fluid passage 13, a valve portion 15 having a flap 4 provided in the main passage 13, a magnetic means 32 disposed in proximity to the valve portion 15 and mounted integrally in the main passage, and a movable body, disposed inside and actuated by the magnetic means.

This device further comprises a separated chamber 11 provided on one side of the valve portion 15 facing the direction from which the fluid is introduced. Between the valve portion 15 and the magnetic means 32, two separate subchambers 11' and 11" are provided by dividing the separated chamber 11 with a diaphragm 6 extended between a wall portion 19 of the separated chamber 11 and a supporting rod 5 mounted on the flap 4 of the valve portion 15 and movable with the flap 4, to form the subchamber 11" between the valve portion 15 and the diaphragm 6 as a part of the main fluid passage 13.

In this embodiment, the subchamber 11' formed between the diaphragm 6 and the upper wall of the separated chamber 11 is provided with an auxiliary passage 53 connected to a point upstream of the main fluid passage 13 and having an auxiliary valve portion 50 provided therein with an auxiliary valve flap 51 thereof in direct contact or indirect contact with the movable body 33 inside of the magnetic means 32. An electromagnet is used as the magnetic means, and an electric control means 37 connected to a detecting the means 39 for detecting characteristic parameter to be controlled is connected thereto.

In this embodiment, the electric control means supplies a pulse wave to the electromagnet 32 having a duty cycle changed in accordance with the data detected by the detector, whereby the movable body 33 is displaced proportionally in accordance with the detected data, and therefore, the valve flap 51 in the auxiliary valve portion is displaced to change the opening of the valve.

In this invention, a regulating chamber 61 is provided between the auxiliary valve portion 50 and the auxiliary passage 53. The regulating chamber 61 is formed by the internal surface of the auxiliary passage 53 and a diaphragm 6' extended between the top end portion of the supporting rod 64 and the wall portion of the auxiliary passage 53. The top portion of the supporting rod 64 is attached to one end of the movable body 33 through a spring 8', and the other end of the movable body 33 is attached to an adjusting screw 35 through the spring 8. Accordingly, the flap 51 of the auxiliary valve portion 50 is displaced upward or downward by up and down movement of the movable body 33 caused by vibration due to variations of the magnetic flux caused by the different duty cycle of the pulse wave applied to the electromagnet 32 to control the pressure of the fluid flow rate passing through the auxiliary passage 53.

The fluid controlled by the auxiliary valve portion 50 is introduced into the regulating chamber 61, and the vibration of the fluid caused by the flap 51 is absorbed therein.

In this embodiment, the fluid controlled by the auxiliary valve portion and flowing inside the auxiliary passage 53 controls the main fluid flow of the main passage by actuating the diaphragm 6 of the governor valve 31.

In this embodiment, a part of the fluid flow is divided at the front of the entrance portion 2 of the governor valve 31 and made to flow along the auxiliary passage 53 to the auxiliary valve portion 50 through a filter 60, and the output fluid flow controlled by the auxiliary valve portion 50 is made to flow into the subchamber 11' formed on one side of the diaphragm 6 opposite to the side facing the main passage 13.

As explained above, the auxiliary valve having the auxiliary flap, controls the fluid flow rate through the auxiliary passage in proportion to variations in the data detected by the detector, and accordingly, when the temperature of the water is low, the opening of the auxiliary valve portion is increased, and thus more gas is allowed to flow into the subchamber 11' to increase the pressure inside the subchamber 11'. Some of the fluid introduced into the subchamber 11" is output from orifice 65. Therefore, the surface of the flap 6 is subjected to a high pressure and the gap 16 formed between the flap 4 and the separating wall 19 of the main passage 13 is varied to the desired value for controlling the gas flow through the main passage in accordance with the detected parameter.

When the temperature of the water is high, the above operation is reversed.

In this embodiment, the movable body of the auxiliary valve portion is vibrated by the pulse wave applied thereto, and this vibration is transmitted to the fluid inside the auxiliary passage, although the vibration is ultimately absorbed by the fluid inside the auxiliary passage, and thus is not transmitted to the governor valve.

EFFECT OF THE INVENTION

According to this invention, since the proportional control valve has the construction as explained above, a precise fluid flow control can be easily carried out because the flow rate of the fluid can be continuously and precisely varied in proportion to the variation of the parameter detected by the detector.

Further, the control circuit of this invention can be simplified, and therefore, the size thereof can be minimized, and moreover, no noise is generated from the control device.

Furthermore, in this invention, when the movable body is indirectly connected to the valve portion, the fine vibration of the movable body caused by the electric voltage or current applied thereto is absorbed by the fluid or spring, for example, and thus will not have any influence on the opening of the valve portion, and a stable control thereof can be obtained.

We claim:

1. A proportional control valve comprising:
   a main fluid passage,
   a valve portion having a flap,
   a magnetic means disposed in proximity to said valve portion and mounted integrally on said main passage,
   a movable body disposed inside said magnetic means and actuated by said magnetic means,
   a separated chamber provided on one side of said valve portion facing a direction from which fluid is introduced and located between said valve portion and said magnetic means, said separated chamber being divided into first and second separate subchambers by a diaphragm extended between a wall portion of said separated chamber and a supporting rod mounted on said flap of said valve portion and movable with said flap, to form said first subchamber between said valve portion and said diaphragm and a part of said main fluid passage, wherein said second subchamber is formed between said diaphragm and an upper wall of said separated chamber and is provided with an auxiliary passage connected to a point upstream of said main fluid passage, and an auxiliary valve portion coupled with an auxiliary valve flap is provided in an intermediate portion of said auxiliary passage between said second subchamber and the portion upstream of said main fluid passage so that a fluid passed through, a pressure level of which is controlled by said auxiliary valve portion, is directed to the second subchamber, said auxiliary valve flap being in contact either directly or indirectly with said movable body arranged inside said magnetic means to be operated, and an electric control means being connected to a detecting means for detecting a characteristic parameter to be controlled and connected to said magnetic means.

2. The proportional control valve according to claim 1, wherein said electric control means provides a varying voltage or electric current to said electromagnet.

* * * * *